(12) United States Patent
Hofer

(10) Patent No.: US 6,364,269 B1
(45) Date of Patent: Apr. 2, 2002

(54) IN-LINE SCOOTER STAND

(76) Inventor: Raymond Davis Hofer, 3615 Locust Ave., Long Beach, CA (US) 90807

( * ) Notice: Subject to any disclaimer, the term of this patent is extended or adjusted under 35 U.S.C. 154(b) by 0 days.

(21) Appl. No.: 09/742,627

(22) Filed: Dec. 20, 2000

(51) Int. Cl.[7] .............................................. A47B 29/00
(52) U.S. Cl. ...................... 248/346.01; 211/20; 211/22; 211/24
(58) Field of Search .................. 248/346.01, 346.03, 248/346.11, 676, 678; 211/17, 20, 22, 23, 24; 280/293, 294, 295, 296, 300, 303

(56) References Cited

U.S. PATENT DOCUMENTS

| | | | | |
|---|---|---|---|---|
| 2,717,084 A | * | 9/1955 | Groenendal | 211/20 |
| 2,915,850 A | * | 12/1959 | Goodfellow | 248/346.11 |
| 4,856,659 A | * | 8/1989 | Krebs | 211/24 |
| 4,883,918 A | * | 11/1989 | Browning | 248/346.01 |
| 5,036,986 A | * | 8/1991 | Kral | 211/20 |
| 5,749,475 A | * | 5/1998 | Krebs | 211/24 |
| 5,966,881 A | * | 10/1999 | Kitagaki | 248/346.01 |
| 6,068,231 A | * | 5/2000 | Kusser et al. | 248/346.01 |

* cited by examiner

*Primary Examiner*—Anita King
*Assistant Examiner*—Gwendolyn Baxter
(74) *Attorney, Agent, or Firm*—Monty Koslover

(57) ABSTRACT

A portable in-line scooter parking stand that can hold a single scooter in an upright parked position. The stand is a rigid base made of aluminum or plastic, which includes a centrally located tapered slot, sized to fit and grip an inserted scooter wheel. Deep longitudinal grooves in the sides of the tapered slot, dig into the rubber sides of an inserted front scooter wheel and hold the scooter firmly upright. Four rubber feet attached to the bottom of the base prevent slippage or sliding. The stand is lightweight, inexpensive, and will hold all in-line scooters with standard 100 mm wheels.

3 Claims, 3 Drawing Sheets

IN-LINE SCOOTER STAND

BACKGROUND OF THE INVENTION

1. Field of the Invention

This invention relates to sports accessories, and more particularly to equipment for parking in-line scooters.

2. Background

Children's in-line scooters have become very popular and are seen everywhere there is a place for using them. In spite of this apparent popularity, most scooters sold to date have no kick-stand or parking mechanism to support them when they are not in use. As a result, the scooters are either dropped to the ground or leaned against a wall. In either case, this usually results in damage or scratches to the wall and the scooter.

Bicycle stands of many types and attachable kick-stands have long been available for use. However, the particular design of an in-line scooter with its 100 mm diameter wheels, a low foot board and a single vertical guide shaft, makes the use of bicycle stands and kick-stands impractical.

Since the design of in-line scooters and current scooter marketing practice does not lend itself to the use of any kind of attachment to a scooter, the ongoing damage and scratches are likely to continue unless a suitable stand is found.

The present invention is offered to provide a suitable stand for in-line scooters that will hold a scooter upright, preventing it from falling and causing damage to itself and adjacent surfaces.

SUMMARY OF THE INVENTION

The invention is a parking stand that will hold a single in-line scooter in an upright parked position, preventing tipping. The stand is a rigid, rectangular base member of aluminum or plastic which includes a tapered slot, sized to fit and grip a scooter wheel. Deep longitudinal grooves in the sides of the tapered slot, dig into the rubber sides of an inserted front scooter wheel and hold the scooter firmly upright. Four rubber pads attached to the underside of the base member prevent slippage or sliding.

The stand is lightweight, portable and will hold all in-line scooters with standard 100 mm wheels.

Accordingly, it is a prime object of the present invention to provide a portable stand for in-line scooters that can be used to hold a scooter upright, preventing property damage.

An advantage of this invention over other stands is that it does not require a scooter owner to drill holes or modify the scooter in any way.

Further objects and advantages of the invention will be apparent from studying the following portion of the specification, the claims and the attached drawings.

DESCRIPTION OF THE PREFERRED EMBODIMENT

Figure 1:
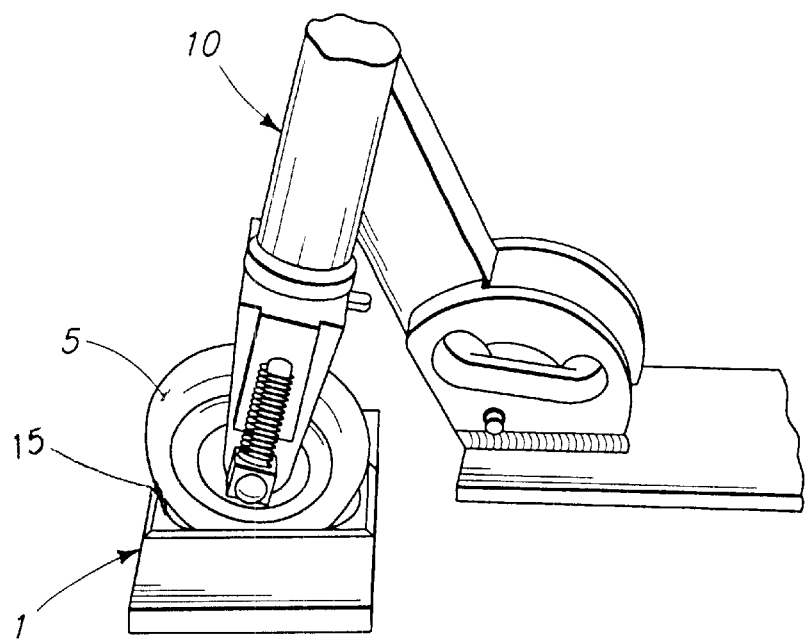
FIG. 1 is a perspective view showing the lower front portion of an in-line scooter with its front wheel in the slot of a scooter stand according to the present invention.
Figure 2:
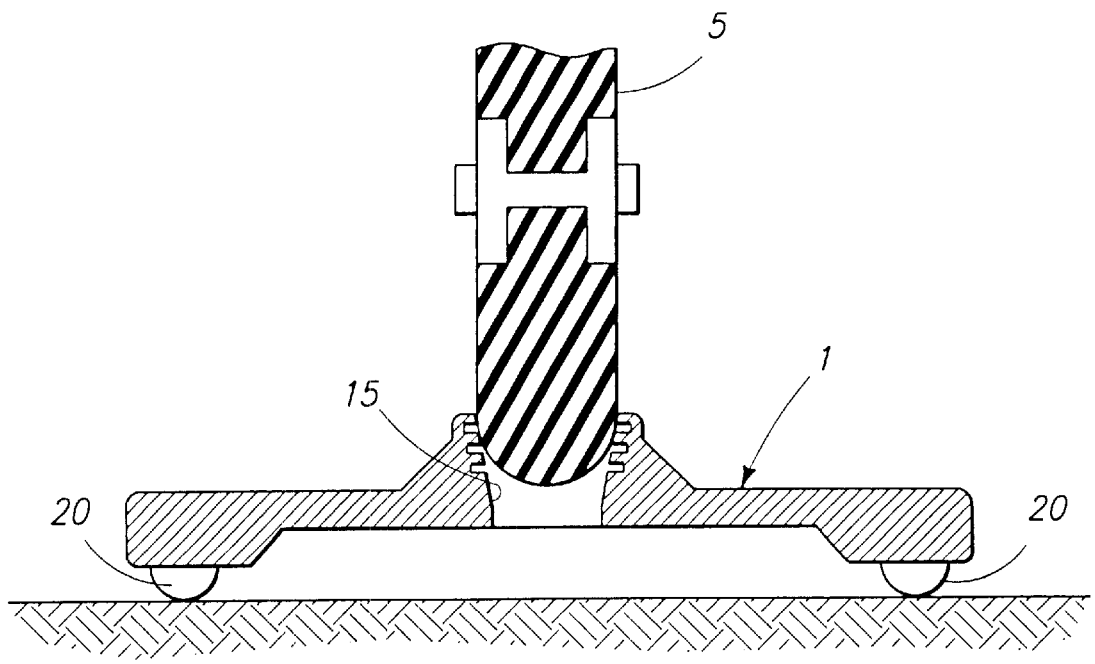
FIG. 2 is a cross-section of the invention stand, particularly showing part of an in-line scooter wheel inserted in the stand slot and being gripped by the tapered wall of slot.

Referring particularly to the drawings, FIGS. 1 and 2 show an in-line scooter 10 being supported and held upright by the present invention scooter stand 1.

In FIG. 1, the lower front portion of an in-line scooter 10 is shown with its front wheel 5 placed in a slot 15 of the invention scooter stand 1 for parking. Since the slot 15 can not be fully shown in the FIG. 1 view, a cross-section view in FIG. 2 is offered as an aid in understanding how the scooter wheel 5 is gripped in the slot 15 and the scooter is prevented from tipping over. As shown in FIG. 2, the inserted scooter wheel 5 tire is gripped tightly by the grooved, tapered sides of the slot 15. The stand 1 comprises a wide base member and four attached rubber pads which support it. The base member is made wide enough, extending an equal amount on both sides of the slot 15, so that an in-line scooter with its front wheel partially inserted in the slot 15 and gripped tightly, can not accidently tip over.

Since the wheel 5 is being tightly held in the stand 1 slot 15 and can not fall out, the scooter will remain parked in an upright position until removed from the stand 1.

Figure 3:
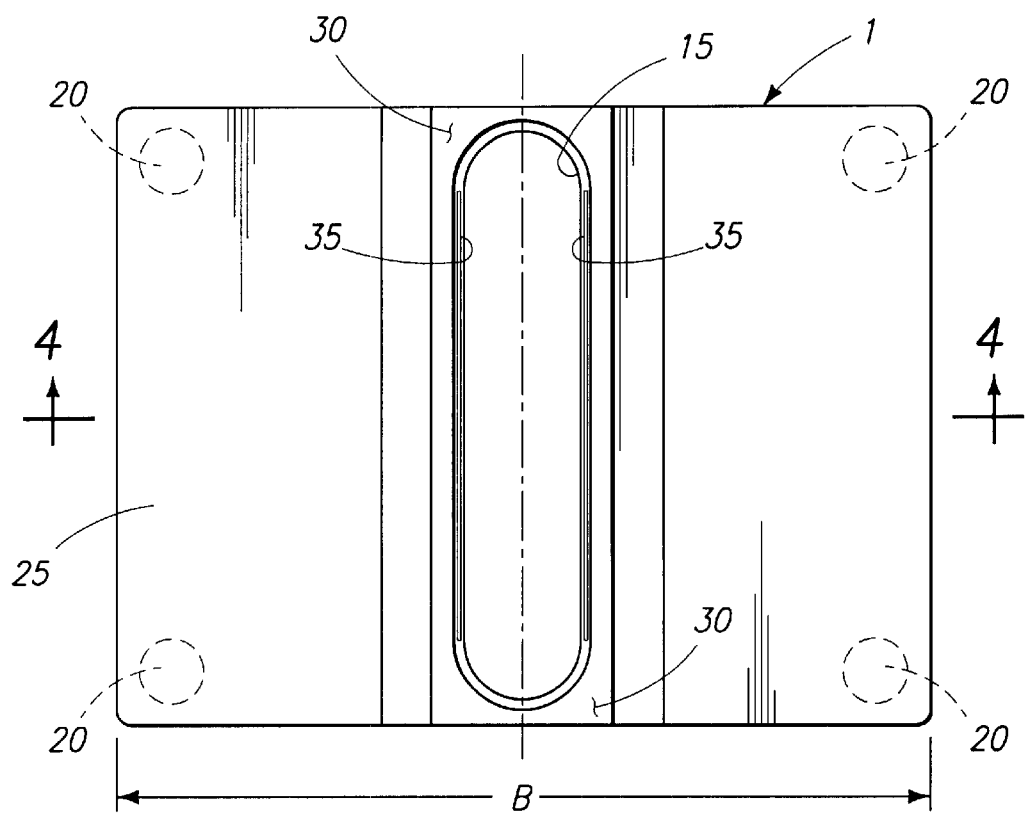
FIG. 3 is a top plan view of the invention stand, particular indicating the required width of the stand base member for scooter support use.
Figure 4:
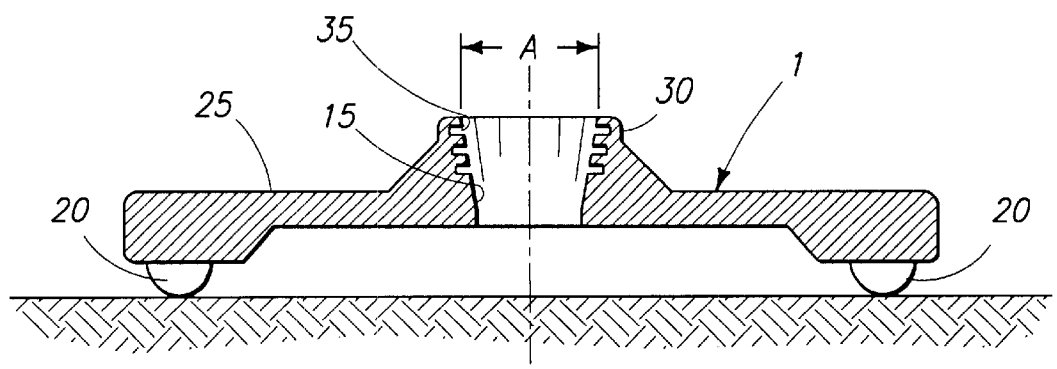
FIG. 4 is a cross-section of the invention stand taken along line 4—4 of FIG. 3.
Figure 5:
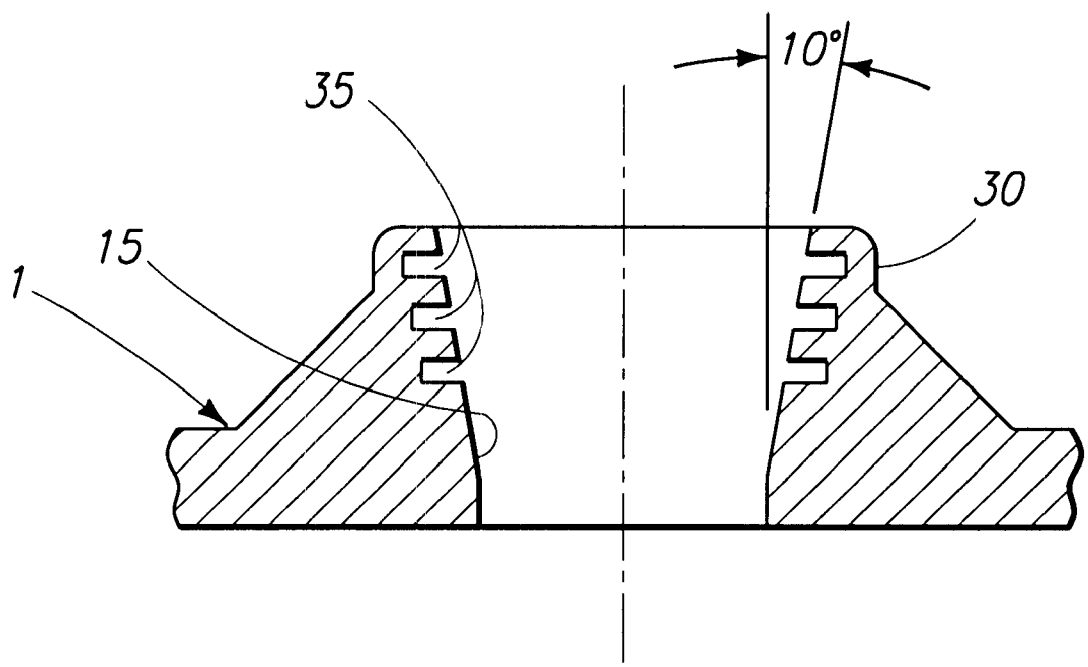
FIG. 5 is a cross-section view of the center portion of the stand base member, particularly showing detail of the slot tapered wall angle and the deep, longitudinal grooves in the wall sides.

Refer now to FIGS. 3, 4 and 5 which are respectively, a top plan view of the stand base member, a cross-section of the base member taken along line 4—4 of FIG. 3, and a cross-section view of the base member center portion.

The base member is made from a generally rectangular block of a lightweight rigid material such as aluminum or plastic. It is cut or formed to have a rectangular plane shape with a long width and shorter sides, and having a centrally located raised portion 30. This raised portion 30 ridge extends 90 degrees to the wide axis of the stand, across the stand surface and provides a location for a tapered slot 15 which acts as the means for holding and gripping an in-line scooter wheel. Balancing the center portion 30 and its slot 15, one on each side, are two equal width, flat wing portions 25 of the base member. These wing portions 25, as measured from the base member center line, have a width that exceeds the height of an in-line scooter center of gravity in order to oppose the tipping moment and prevent any scooter tipping. For use with typical in-line scooters which have a 100 mm. (3.9 in.) diameter wheel, the overall width "B" of the stand, which includes both wing portions and the center, has been calculated to be at least 140 mm (5.5 in.). In test, this width effectively counters any scooter self-tipping action.

The length of the slot 15 is made a little less than the diameter of a scooter wheel, but the slot width "A" at the top of the slot is held at about. 24 mm. (0.95 in.) in order to fit a scooter wheel closely, while allowing it to be pushed into the slot 15. The slot wall sides are tapered inwards at an angle of about 10 degrees with the vertical, so as to compress the sides of an inserted wheel tire. In addition, a number of deep, wide, longitudinal grooves 35 are cut in the upper sides of the slot 15 walls. These grooves 35 will press into any inserted tire rubber surface and engage it, ensuring positive gripping and holding of a scooter wheel.

Four rubber pads 20, one near each corner of the base are attached to the under side of the base member to prevent the stand from slipping, sliding or accidentally marring the surface on which it rests.

The scooter stand is light, weighing about 14 ounces, and is finished with smoothed, colored outer surfaces. It is easily carried and useable anywhere, indoors or out. Its indoor use will prevent dirty floors and scratched walls from leaning or dropped in-line scooters. The stand should therefore be a very useful accessory for an owner of an in-line scooter. Further, to facilitate ownership, the stand is reasonably low in cost.

From the foregoing description, it is clear that the embodiment of the in-line scooter stand achieves the objects of the present invention. Various modifications may be apparent to those skilled in the art. These modifications are considered to be within the scope and spirit of the present invention and are encompassed thereby.

Having described the invention, what is claimed is:

1. A stand for supporting an in-line scooter in an upright position, the stand comprising:

(a) a generally rectangular shaped, rigid base member having a long, raised portion projecting above the top surface of said base member and located along a plane center axis of said base member; said raised portion including a wide slot cut along the center axis and through the base member, said slot having tapered walls which slope outward from a slot bottom at an angle of about 10 degrees, producing a slot top width of about 24 mm, and having a slot length sufficient to permit partial insertion of an in-line scooter wheel therein; said slot including a multiplicity of deep, longitudinal grooves cut in said tapered walls; said base member having an overall width of at least 140 mm to counter any scooter self-tipping action after a scooter wheel has been inserted into said slot; and (b) four rubber pads that are fastened to the underside of said base member for support, one pad near to each corner;

said stand, when the front wheel of an in-line scooter is pushed partly into said slot, adapted to grip said front wheel tightly with said grooves in said slot, holding said in-line scooter upright and preventing said in-line scooter from tipping over.

2. The stand according to claim 1, wherein said base member is made from aluminum material.

3. The stand according to claim 1, wherein said base member is made from rigid plastic material.

* * * * *